United States Patent [19]
Callaghan, Jr.

[11] Patent Number: 5,765,319
[45] Date of Patent: Jun. 16, 1998

[54] BIRD BARRIER FOR VENT OPENINGS

[76] Inventor: George W. Callaghan, Jr., 8631 Richmond Hwy., Alexandria, Va. 22309

[21] Appl. No.: 873,886

[22] Filed: Jun. 12, 1997

[51] Int. Cl.$^6$ ............................................. E04B 1/72
[52] U.S. Cl. ............................................. 52/101
[58] Field of Search ............................................. 52/101

[56] References Cited

U.S. PATENT DOCUMENTS

| | | | |
|---|---|---|---|
| 2,485,148 | 10/1949 | Fralin | 52/101 |
| 2,938,244 | 5/1960 | Christensen | 52/101 |
| 3,436,882 | 4/1969 | Keefe | 52/101 |
| 4,262,169 | 4/1981 | Lanton, Jr. | 52/101 X |
| 5,497,585 | 3/1996 | Engler | 52/101 |

*Primary Examiner*—Christopher Kent
*Attorney, Agent, or Firm*—H. Jay Spiegel

[57] ABSTRACT

A bird barrier includes an elongated base enclosing a wire from which depends a plurality of pivotably mounted thin wire-like appendages. The base is mounted on a fixed surface in a manner such that the appendages can dangle in front of and hang below an opening such as a vent opening on a house or other building. The pivotable relationship between the base and the appendages allows mounting of the base on surfaces having diverse angular relationships with respect to a vent opening so that, regardless of the configuration of the mounting surface, the appendages will dangle in front of the opening.

19 Claims, 4 Drawing Sheets

FIG. 1
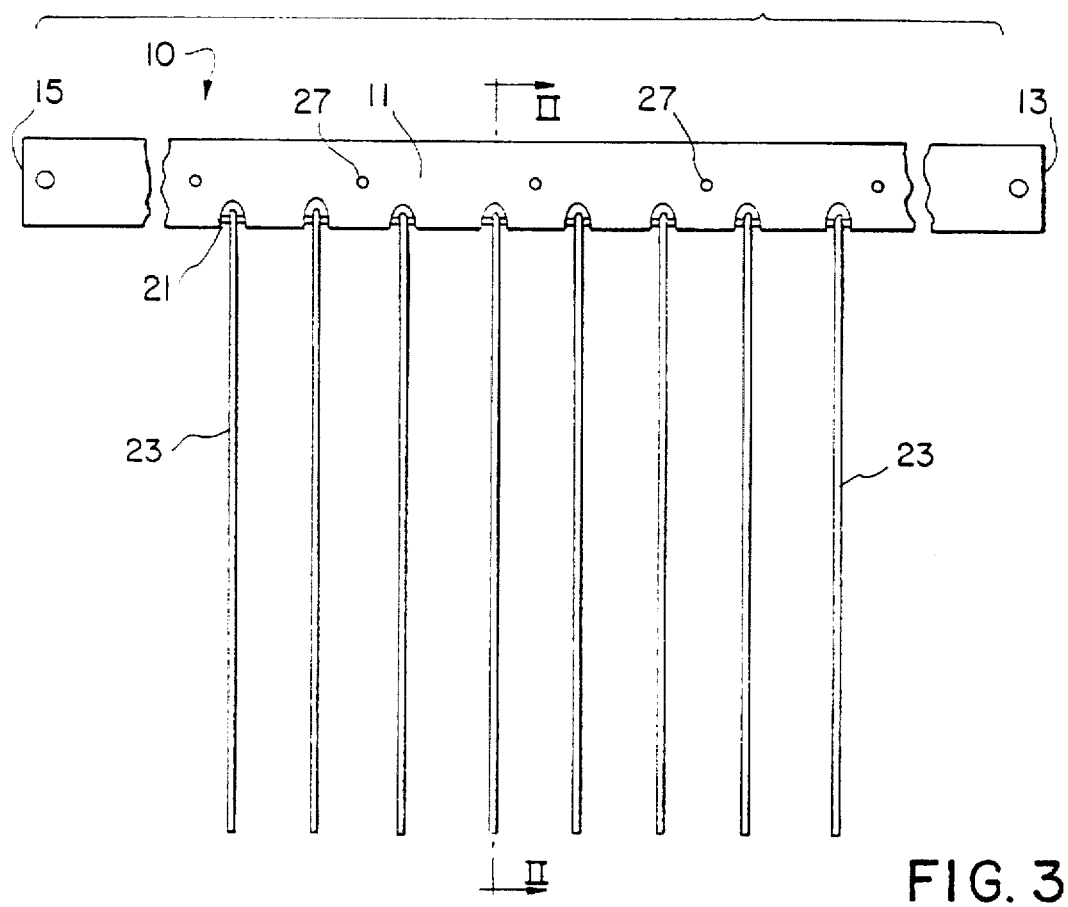
FIG. 2
FIG. 3
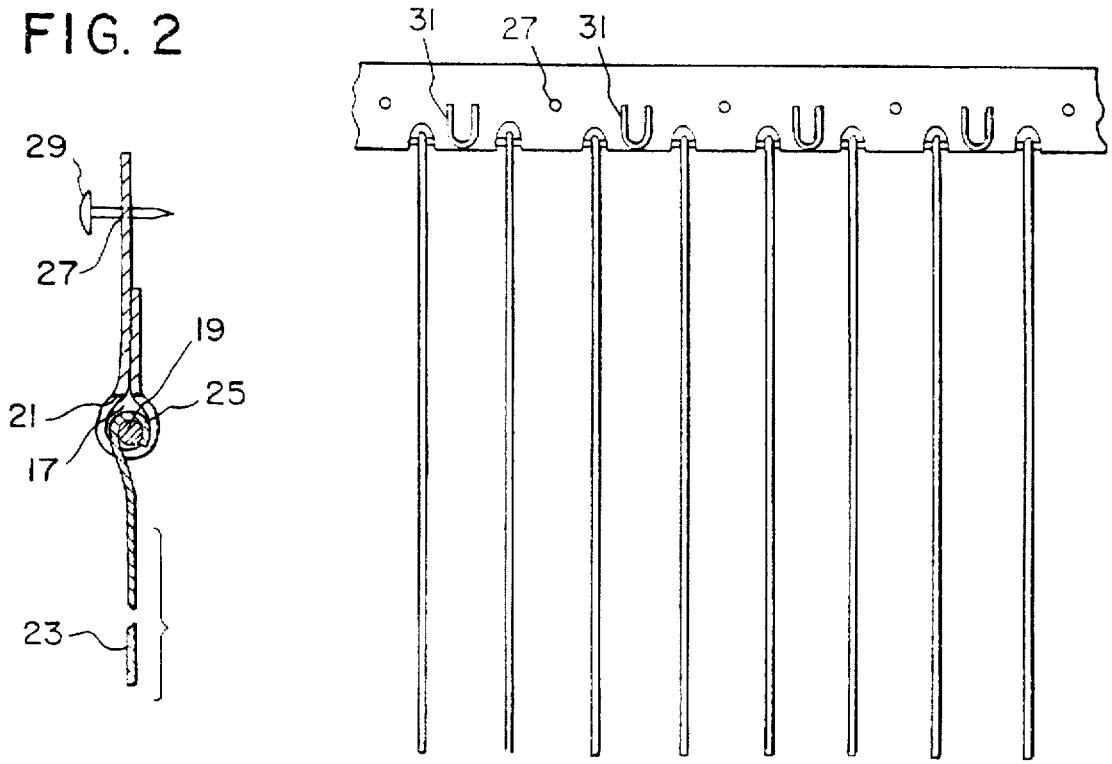

U.S. Patent    Jun. 16, 1998    Sheet 2 of 4    5,765,319
FIG. 4
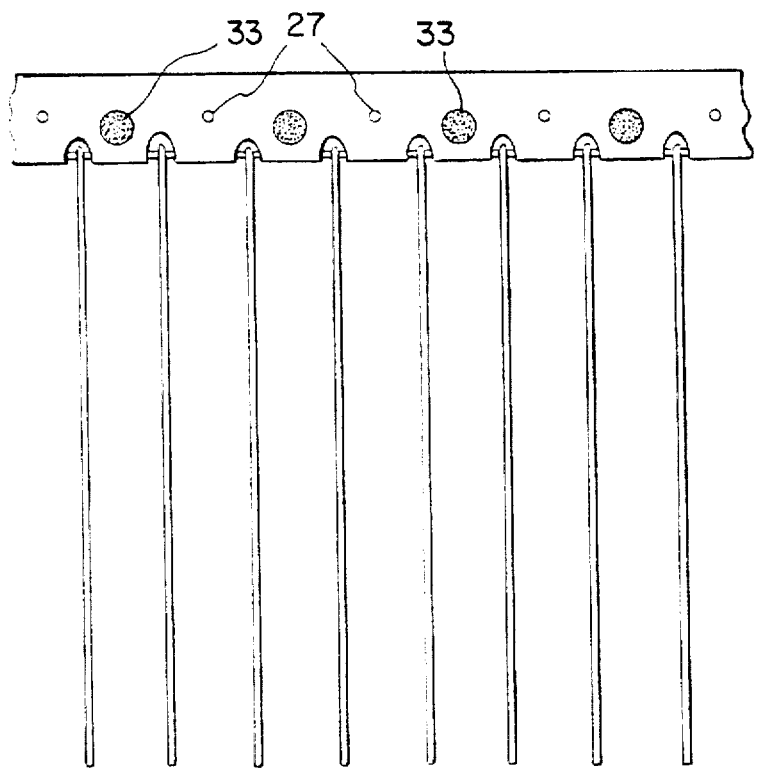
FIG. 5
FIG. 6
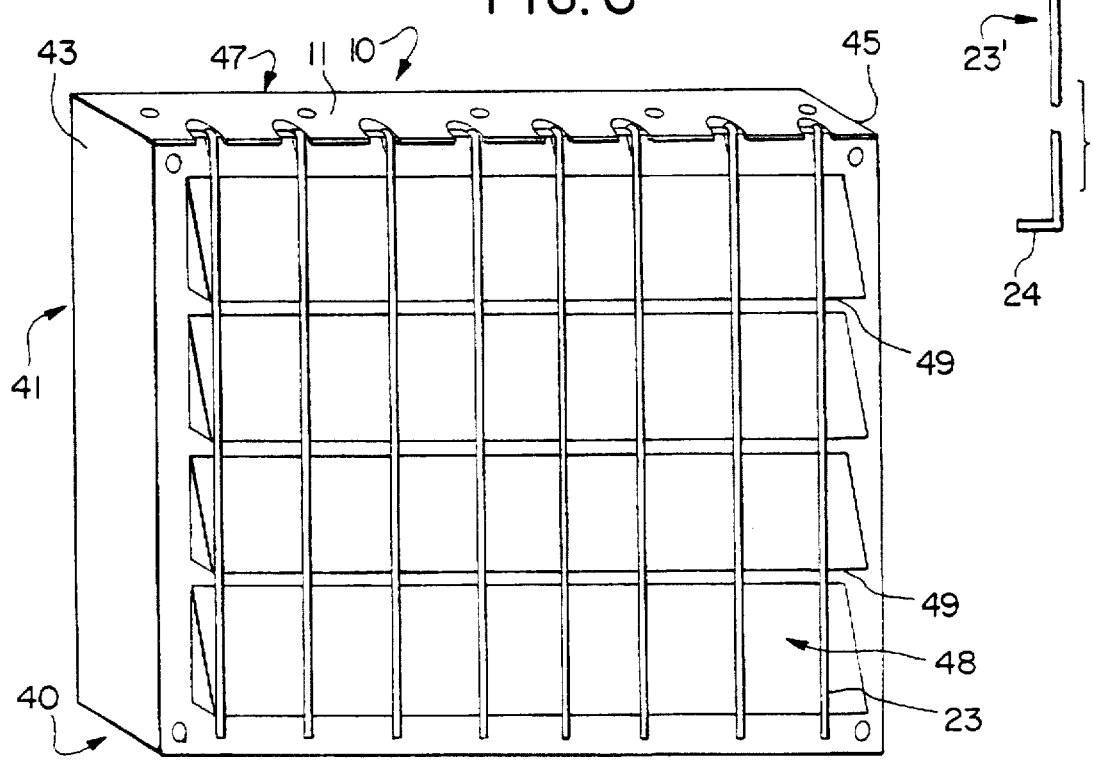

BIRD BARRIER FOR VENT OPENINGS

BACKGROUND OF THE INVENTION

The present invention relates to an improved bird barrier for vent openings. In the prior art, bird barriers are known, however, Applicant is unaware of any such device including all of the features and aspects of the present invention. The following prior art is known to Applicant:

U.S. Pat. No. 2,938,243 to Peles discloses a bird proofing device including a base to which are affixed a plurality of upstanding spike-like appendages. The present invention differs from the teachings of Peles as contemplating pivotably attaching the appendages to the base.

U.S. Pat. No. 3,436,882 to Keefe discloses a pigeon chaser including a flexible support member to which are attached spaced elements that are pivotably mounted on the wire. The present invention differs from the teachings of Keefe as contemplating appendages that are thin and long and as contemplating a base member having attachment means thereon in areas adjacent the appendages to allow affixing to a desired support.

U.S. Pat. No. 5,400,552 to Negre discloses a preventive device against nuisance from birds including a base to which are affixed upstanding spike-like members. The present invention differs from the teachings of Negre as contemplating appendages pivotably mounted to a base having attachment means thereon.

SUMMARY OF THE INVENTION

The present invention relates to an improved bird barrier for vent openings. The present invention includes the following interrelated objects, aspects and features:

(1) In a first aspect, the present invention includes an elongated base made of a strip of material such as, for example, thin flexible metal such as is commonly used in roof flashings. In a preferred embodiment, the elongated base includes a portion folded upon itself to form an elongated chamber receiving a wire.

(2) The elongated base includes attachment means facilitating attachment thereof to a support such as a surface adjacent a vent opening installed on a building. In one embodiment, the attachment means consists of a series of spaced openings formed through the strip of material that are sized to receive a fastener such as a screw, a nail or the like. In a further embodiment, pressure clips are mounted on the strip of material at spaced locations therealong allowing fastening to a mounting surface. In a still further embodiment, hook and pile fastening means may be attached to the strip of material at spaced locations therealong or an elongated strip of hook and pile fastening means may be used. Additionally, adhesive means may be suitably employed.

(3) A plurality of spaced elongated wire-like appendages are attached to the elongated wire contained within the elongated chamber of the base. Each appendage includes a loop-like portion that extends around the elongated wire and allows the appendage to pivotably move with respect to the wire. In the preferred embodiment of the present invention, each wire-like appendage is made of any suitable metallic or plastic material. In the case of metallic materials, those materials that resist rusting are preferred.

(4) In a further aspect, the elongated base may extend laterally beyond the extent of the spaced wire-like appendages so that the base can be bent around a support surface or can be extended laterally of the vent opening over which the appendages are to extend.

(5) The inventive bird barrier may be suitably employed to cover louvre vents, may be mounted on hinged vent covers, may be mounted on dryer/fan vents and may also be mounted with a plurality of bird barriers mounted adjacent one another.

Accordingly, it is a first object of the present invention to provide an improved bird barrier for vent openings.

It is a further object of the present invention to provide such a device including an elongated strip of material having attachment means thereon.

It is a still further object of the present invention to provide such a device wherein a plurality of spaced elongated wire-like appendages are pivotably mounted in depending relation to the base.

It is a still further object of the present invention to provide such a device usable in association with louvre vents, hinged vent covers, dryer/fan vents and the like.

These and other objects, aspects and features of the present invention will be better understood from the following detailed description of the preferred embodiments when read in conjunction with the appended drawing figures.

BRIEF DESCRIPTION OF THE DRAWINGS

FIG. 1 shows a front view of one preferred construction of the present invention.

FIG. 2 shows a cross-sectional view along the line 2—2 of FIG. 1.

FIG. 3 shows a front view similar to that of FIG. 1 but showing a modification in the attachment means thereof.

FIG. 4 shows a view similar to that of FIGS. 1 and 3 but showing a her embodiment of attachment means.

FIG. 5 shows a modification to an elongated wire-like appendage in accordance with the teachings of the present invention.

FIG. 6 shows an example of the present invention top-mounted on a louvre vent.

SPECIFIC DESCRIPTION OF THE PREFERRED EMBODIMENTS

Figure 7:
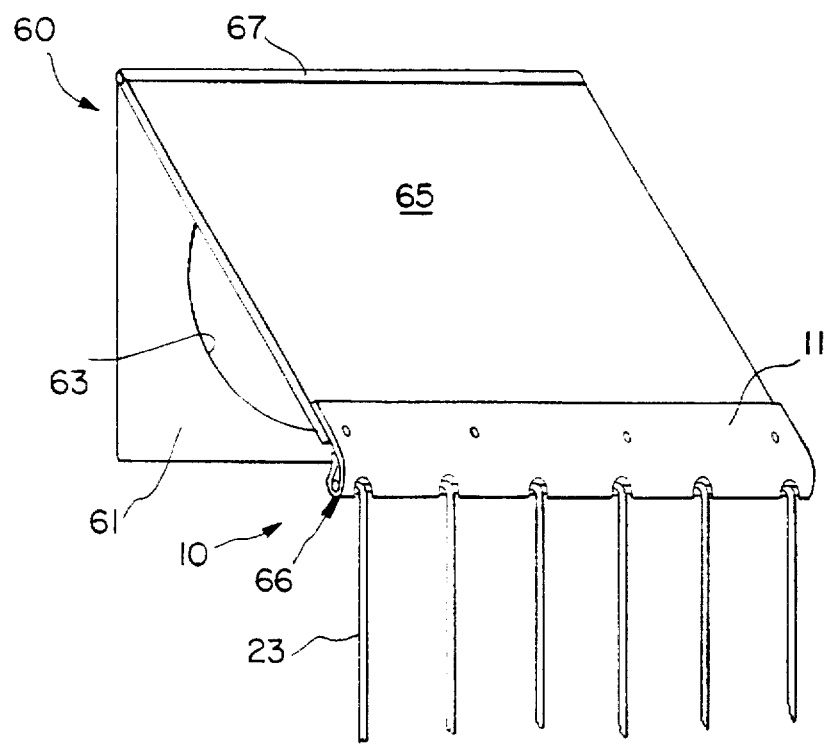
FIG. 7 shows an example of the present invention mounted on a hinged vent cover.

With reference, first, to FIG. 1, the present invention is generally designated by the reference numeral 10 and is seen to include an elongated base 11 having ends 13 and 15. With reference to FIG. 2, the base 11 includes material folded upon itself to define a chamber 17 in which is captured an elongated wire 19. A plurality of slots 21 are formed in the material of the base 11 at spaced locations therealong to expose the wire 19 at each spaced location.

As shown in FIG. 1, a plurality of spaced elongated wire-like appendages 23 depend downwardly from the base 11. With particular reference to FIG. 2, it is seen that each appendage includes a hook-like top portion 25 that is mounted over the wire 19 at a slot 21 with the hook-like portion 25 allowing the appendage 23 to pivotably move with respect to the wire 9.

With reference back to FIG. 1, attachment means are provided in the base 11 to facilitate attachment of the base to an appropriate support. As shown in FIG. 1, this attachment means may consist of a plurality of spaced holes 27. As shown in FIG. 2, suitable fasteners 29 may be inserted through respective ones of the holes 27 and then installed in the associated support to affix the inventive bird barrier 10 thereon. The fasteners 21 may comprise nails, screws or any suitable fastener.

As also seen in FIG. 1, if desired, the ends 13 and 15 of the base 11 may laterally extend beyond the last ones of the appendages 23. Alternatively, if desired, the ends 13 and 15 of the base 11 may be located immediately adjacent the end ones of the appendages 23.

With reference to FIG. 3, the attachment means may consist of a plurality of spaced pressure clips 31 instead of or in addition to the holes 27.

With reference to FIG. 4, the attachment means may consist of a plurality of hook and pile fastening means 33 instead of or in addition to the holes 27. Alternatively, instead of employing spaced hook and pile fastening means, a continuous strip thereof may be suitably employed.

With reference to FIGS. 6–10, various examples of applications of the present invention will now be explained.

FIG. 6 shows a louvre vent 40 having a housing 41 with side walls 43, 45 and a top wall 47. Horizontal louvres 49 extend laterally across a generally rectangular opening 48. The inventive bird barrier 10 is mounted on the housing 41 with the elongated base 11 thereof mounted over the top surface 47 thereof and with the appendages 23 dangling in front of and below the louvres 49. Due to the pivoting of the appendages 23 with respect to the wire 19, the relationship shown in FIG. 6 is easily achieved.

FIG. 7 shows a vent 60 including a plate 61 mounted to a wall and defining a vent opening 63. A cover 65 is pivotably mounted over the plate 61 by virtue of the attachment means 67. The inventive bird barrier 10 is mounted on the cover 65 with the base 11 mounted adjacent a bottom edge 66 of the cover 65 and with the appendages 23 dangling down below the bottom edge 66 of the cover 65. The cover 65 pivots to the open position shown in FIG. 7 responsive to pressure exerted thereon by gases flowing out the opening 63. Due to the relative pivoting of the appendages 23 with respect to the wire 19, the appendages 23 adopt a vertical orientation regardless of the position of the cover 65.

Figure 8:
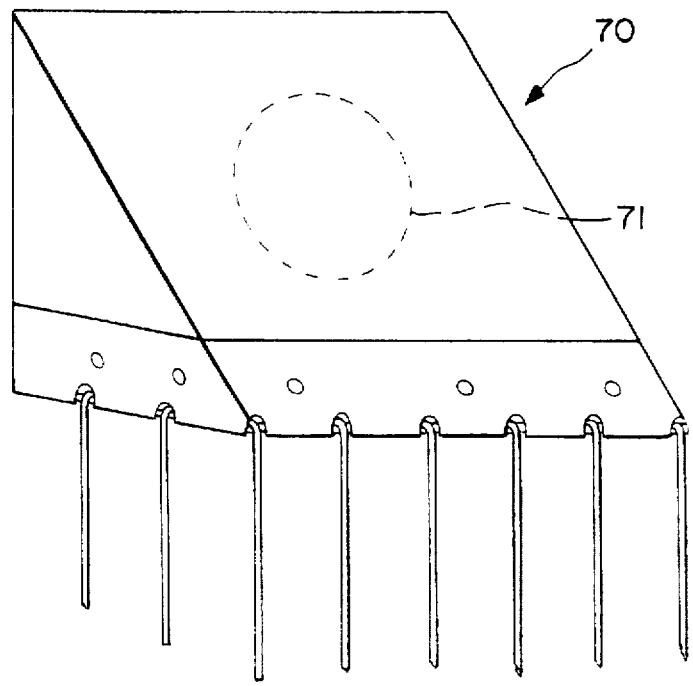
FIGS. 8 and 9 show side and front views, respectively, of the present invention mounted on the fixed cover a dryer/fan vent.
Figure 9:
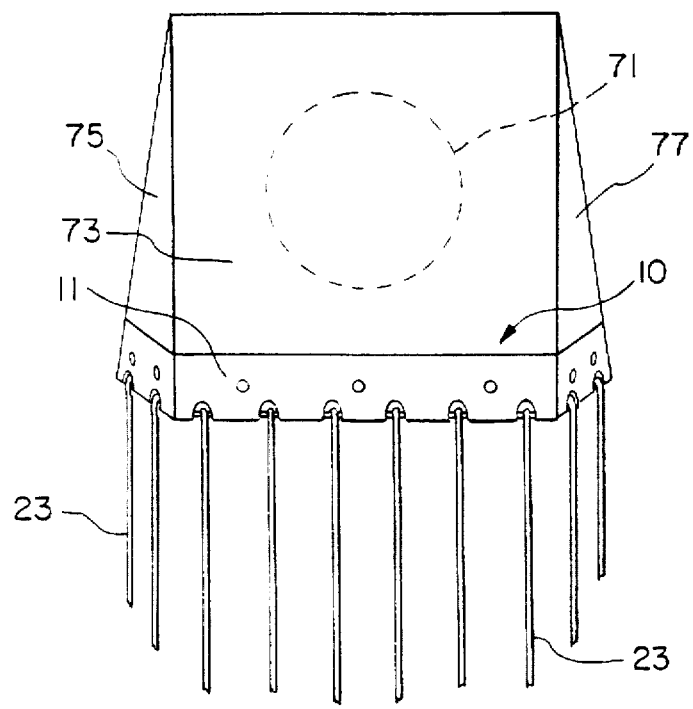

FIGS. 8 and 9 show a hood-like cover for a dryer/fan vent having an opening 71 shown in phantom in the figures. The cover 70 includes a front wall 73 and side walls 75, 77 and include a bottom opening defined by the bottom edges of the walls 75, 73 and 77 allowing gases flowing through the opening 71 to escape to atmosphere. The inventive device 10 is mounted to the walls 75, 73 and 77 adjacent the bottom edges thereof and, as shown in FIGS. 8 and 9, the base 11 thereof is bent to conform to the configuration of the walls 75, 73 and 77.

Figure 10:
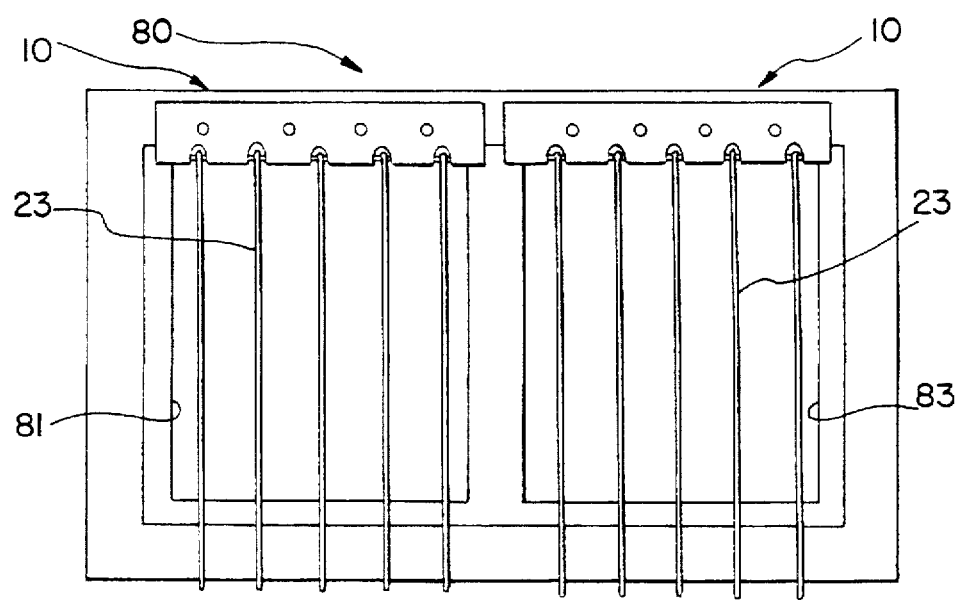
FIG. 10 shows an example of the use of two bird barriers in accordance with the teachings of the present invention mounted side-by-side adjacent one another over a vent opening.

FIG. 10 shows a double vent 80 having lateral elongation and openings 81 and 83. Two bird barriers 10 are seen to be mounted side-by-side over the openings 81, 83 with the appendages 23 dangling below the bottoms of the openings 81 and 83.

In the embodiments of the present invention, the elongated base 11 is preferably made of a flexible metal material such as that which is commonly used in roof flashings. This material allows the base 11 to be bent to conform with diverse mounting locations as exemplified by the hood illustrated in FIGS. 8 and 9. Where the base 11 will not be bent, it may also be suitably made of any desired plastic material. Where the elongated base 11 is made of a metallic material, the material should be rust proof.

The appendages 23 may be made of any suitable metal or plastic and, again, where metal is employed, the metal employed should be rust proof. As depicted in FIG. 5, an appendage 23' may have a bottom termination 24 that is bent with respect to the main portion of the appendage. Such a bent portion 24 may be provided facing the opening over which the inventive bird barrier 10 is mounted to limit the degree of movement toward the opening. The angle formed between the main body of the appendage 23' and the bottom termination 24 may be any desired angle, preferably, an angle from 1° to 90°.

As such, an invention has been disclosed in terms of preferred embodiments thereof which fulfill each and every one of the objects of the present invention and provide a new and useful bird barrier for vent openings of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. A bird barrier, comprising:
   a) an elongated base having first and second ends and having attachment means thereon between said ends for attaching said base to a support surface; and
   b) a plurality of spaced thin elongated appendages pivotably mounted on said base.

2. The barrier of claim 1, wherein said base is made of a flexible material.

3. The barrier of claim 2, wherein said material comprises metal.

4. The barrier of claim 1, wherein said attachment means includes spaced attachment locations on said base, at least one of said locations being between two of said appendages.

5. The barrier of claim 4, wherein said attachment means comprises spaced openings through said base each sized to receive an elongated fastener.

6. The barrier of claim 4, wherein said attachment means comprises spaced pieces of hook and pile fastening means mounted on said base.

7. The barrier of claim 4, wherein said attachment means comprises spaced pressure clips mounted on said base.

8. The barrier of claim 1, wherein said base includes an elongated rigid wire, said appendages being pivotably mounted on said wire.

9. The barrier of claim 1, wherein said base extends laterally of a lateral extent of said spaced appendages.

10. A bird barrier, comprising:
    a) an elongated base made of a flexible material having spaced attachment means thereon for attaching said base to a support surface;
    b) a plurality of spaced thin elongated appendages pivotably mounted on said base; and
    c) said base including an elongated wire, said appendages being pivotably mounted on said wire, said base including a plurality of spaced slots exposing correspondingly spaced portions of said wire, each respective appendage extending into a respective slot and connecting to said wire.

11. The barrier of claim 10, wherein said attachment means comprises spaced openings through said base each sized to receive an elongated fastener.

12. The barrier of claim 10, wherein said base extends laterally of a lateral extent of said spaced appendages.

13. The barrier of claim 10, wherein at least one attachment location is between two of said appendages.

14. The barrier of claim 10, wherein each appendage has a hook-like end disposed about said wire.

15. The barrier of claim 14, wherein each appendage includes another end remote from said base, said end being angled with respect to a major portion of said appendage.

16. A bird barrier, comprising:

a) an elongated base having attachment means thereon for attaching said base to a support surface, said base including an elongated wire;

b) a plurality of spaced thin elongated appendages pivotably mounted on said wire; and c) said base including a plurality of spaced slots exposing correspondingly spaced portions of said wire, each respective appendage extending into a respective slot and connecting to said wire.

17. A bird barrier, comprising:

a) an elongated base having attachment means thereon for attaching said base to a support surface, said attachment means including spaced attachment locations on said base;

b) a plurality of spaced thin elongated appendages pivotably mounted on said base; and c) at least one attachment location being located between two of said appendages.

18. A bird barrier, comprising:

a) an elongated base having attachment means thereon for attaching said base to a support surface, said base including an elongated wire; and b) a plurality of spaced thin elongated appendages pivotably mounted on said wire, each appendage having a hook-like end disposed about said wire.

19. A bird barrier, comprising:

a) an elongated base having attachment means thereon for attaching said base to a support surface; and b) a plurality of spaced thin elongated appendages pivotably mounted on said base, each appendage including an end remote from said base, said end being angled with respect to a major portion of said appendage.

* * * * *